United States Patent
Shiraishi

(10) Patent No.: US 8,477,387 B2
(45) Date of Patent: Jul. 2, 2013

(54) IMAGE READING APPARATUS AND METHOD FOR CONTROLLING THE SAME

(75) Inventor: Mitsuo Shiraishi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 13/005,405

(22) Filed: Jan. 12, 2011

(65) Prior Publication Data

US 2011/0188095 A1    Aug. 4, 2011

(30) Foreign Application Priority Data

Feb. 3, 2010    (JP) .................................. 2010-022521

(51) Int. Cl.
*H04N 1/04*    (2006.01)

(52) U.S. Cl.
USPC ............ 358/474; 358/498; 358/496; 358/444

(58) Field of Classification Search
USPC .................. 358/474, 498, 496, 444, 494, 524
See application file for complete search history.

(56) References Cited

U.S. PATENT DOCUMENTS

| 6,181,443 B1 * | 1/2001 | Takahashi et al. ............ 358/498 |
| 6,438,350 B1 * | 8/2002 | Hasegawa et al. ............ 399/374 |
| 7,042,591 B1 | 5/2006 | Yamazaki et al. ............. 358/1.5 |
| 2011/0007369 A1 | 1/2011 | Shiraishi ....................... 358/483 |

FOREIGN PATENT DOCUMENTS

| JP | 11-146153 | * | 5/1999 |
| JP | 2004-040312 |  | 2/2004 |

* cited by examiner

*Primary Examiner* — Houshang Safaipour
(74) *Attorney, Agent, or Firm* — Fitzpatrick, Cella, Harper & Scinto

(57) ABSTRACT

An image reading apparatus that improves reading productivity during simultaneous double-sided reading without leading to increases in the size and cost of the apparatus and a method for controlling the image reading apparatus are provided. To accomplish this, the image reading apparatus, in the case of a single-sided reading mode, controls the scanning speed of a first image reading unit to a first scanning speed and controls the distance between original document sheets to a first distance between original document sheets. On the other hand, in the case of a double-sided reading mode, the image reading apparatus controls the scanning speed of the first image reading unit to a second scanning speed that is the scanning speed of a second image reading unit and that is slower than the first scanning speed, and controls the distance to a second distance that is shorter than the first distance.

6 Claims, 9 Drawing Sheets

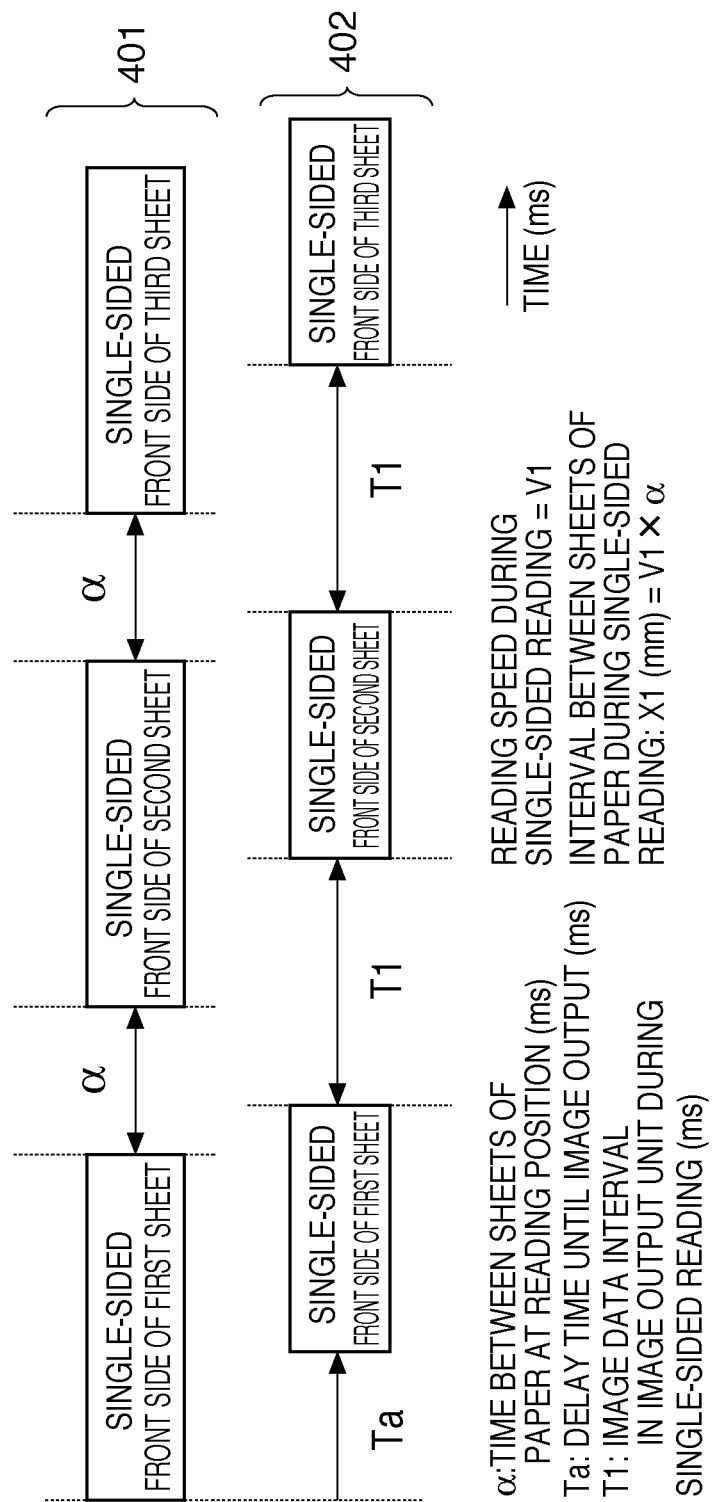

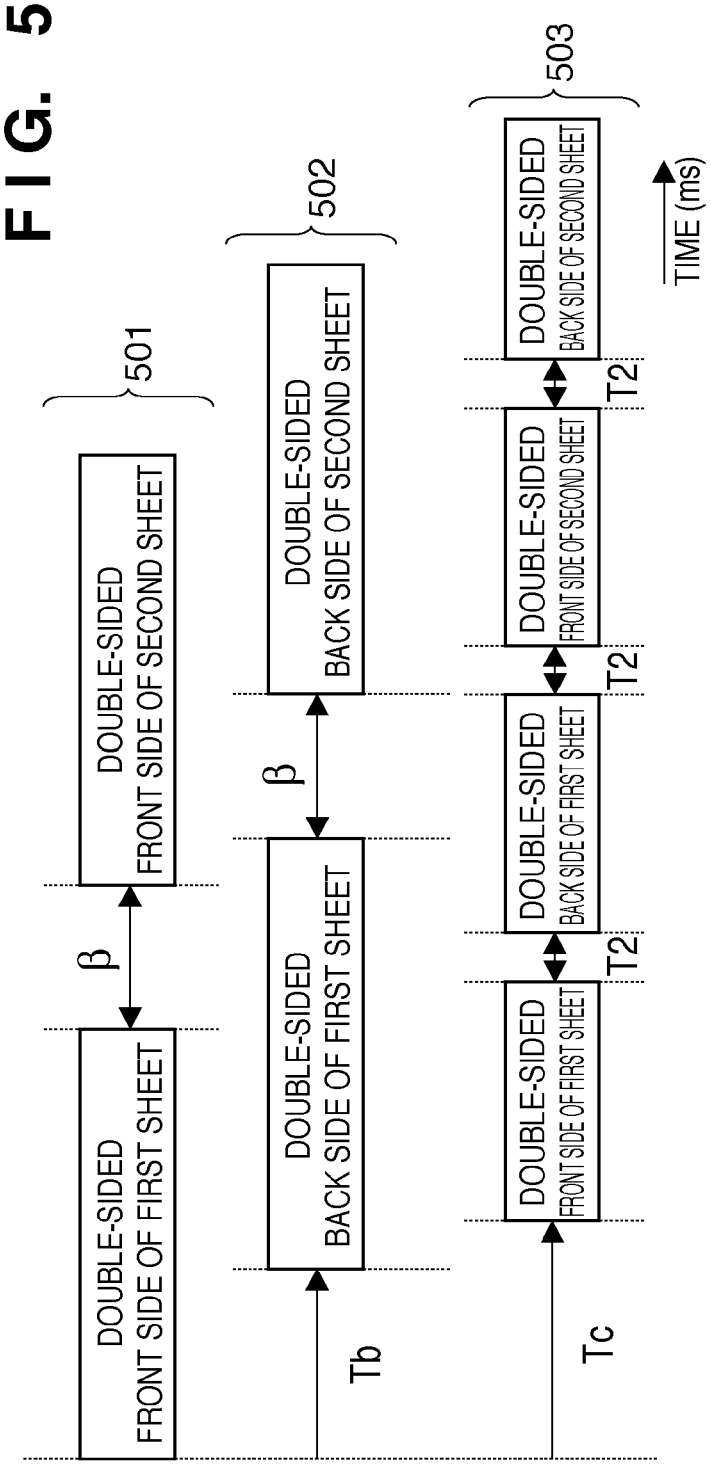

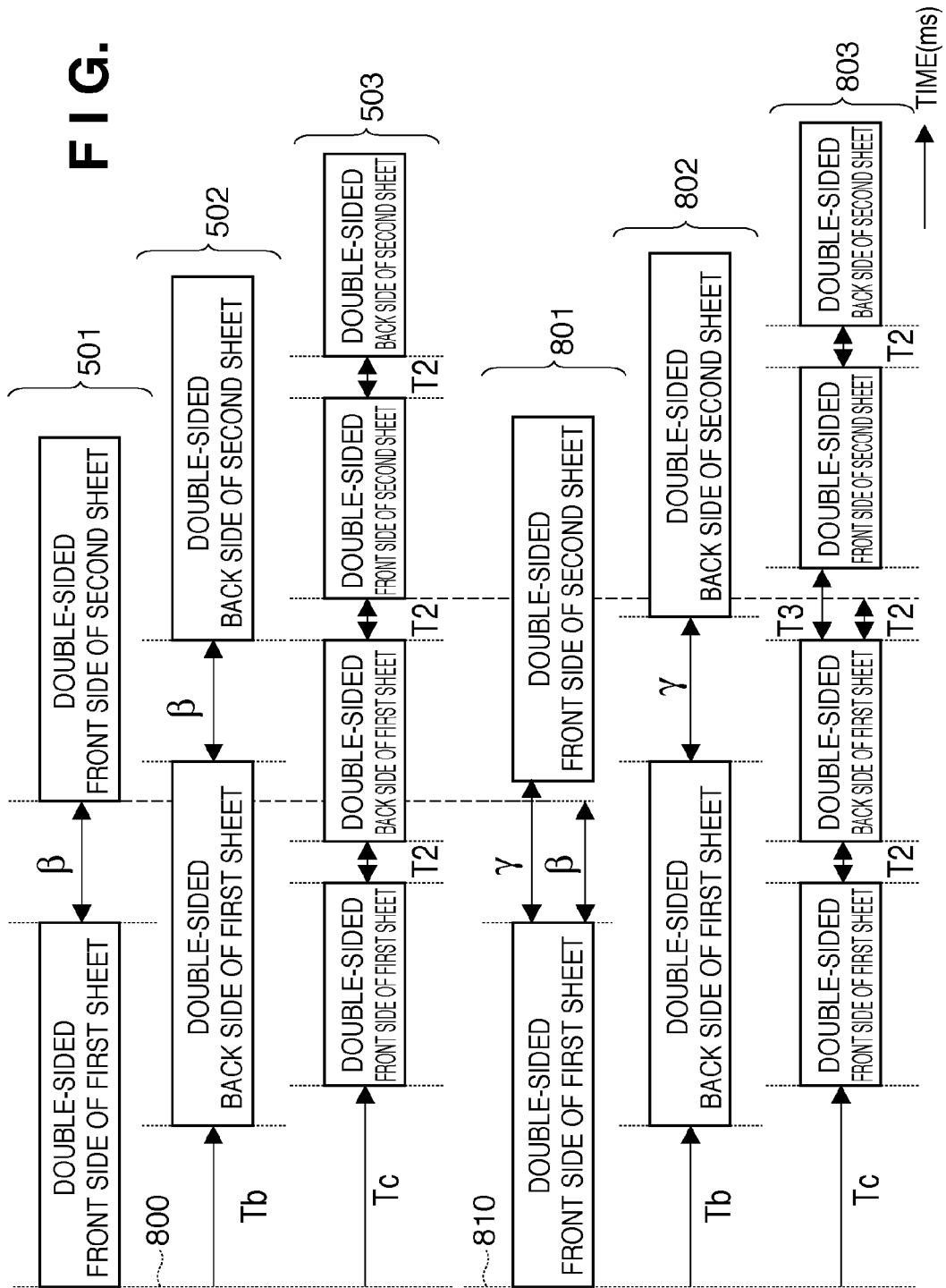

IMAGE READING APPARATUS AND METHOD FOR CONTROLLING THE SAME

BACKGROUND OF THE INVENTION

1. Field of the Invention

The present invention relates to an image reading apparatus provided with image reading units for a front side and a back side, respectively, and a method for controlling the image reading apparatus.

2. Description of the Related Art

At present, an image reading apparatus that is capable of simultaneously reading the front side and the back side of an original document sheet has been proposed. In the image reading apparatus, two image reading units for the front side and the back side, respectively, are provided in close proximity to each other on an original document conveyance path, and since time periods for which the two image reading units read the original document sheet overlap, scanning speeds (original document conveying speeds) of the two image reading units are set to the same speed during double-sided reading (Japanese Patent Laid-Open No. 2004-040312). The performance of a sensor of the backside image reading unit of this image reading apparatus is lower than the performance of a sensor of the frontside image reading unit, and therefore during double-sided reading, it is necessary to adjust the scanning speed of the frontside image reading unit to conform to the performance of the backside image reading unit. For this reason, the scanning speed of the frontside image reading unit during double-sided reading is reduced so as to be lower than the scanning speed of the frontside image reading unit during single-sided reading.

However, the above-described conventional technology has room for improvement where reading productivity during double-sided reading is concerned. Specifically, in the image reading apparatus according to the above-described conventional technology, when a plurality of original document sheets are read while being conveyed sequentially, the interval between original document sheets is controlled so that the distance between original document sheets, which is the distance between a trailing edge of a preceding original document sheet and a leading edge of a following original document sheet, is a predetermined distance. This distance between original document sheets is always controlled to be constant whether the reading mode is a single-sided reading mode or a double-sided reading mode. Here, according to the technology described in Japanese Patent Laid-Open No. 2004-040312, the image reading unit for the back side that is used at a scanning speed slower than the scanning speed of the image reading unit for the front side is provided, and the scanning speed of the image reading unit for the front side is reduced during double-sided reading. However, if the distance between original document sheets is adjusted to conform to the scanning speed and the image data transfer speed during single-sided reading, during double-sided reading in which the scanning speed is reduced, the original document conveying speed slows down, and the time interval (the time between sheets of paper) between the trailing edge of the preceding original document sheet and the leading edge of the following original document sheet increases accordingly when compared to that during the single-sided reading mode. On the other hand, the image data transfer speed is constant irrespective of the mode, and therefore in the case where the time between sheets of paper is longer than necessary with respect to the image data transfer time, that excess time between sheets of paper is wasted time, resulting in a reduction in the original document reading productivity.

As described above, although the proposal disclosed in Japanese Patent Laid-Open No. 2004-040312 employs a small and low-cost image reading unit for the back side and thus has the advantages that a size reduction and a cost reduction of the image reading apparatus can be realized, a high reading productivity cannot be expected simply by adjusting the scanning speed to conform to the performance of the image reading unit for the back side.

SUMMARY OF THE INVENTION

The present invention realizes an image reading apparatus that improves reading productivity during simultaneous double-sided reading without leading to increases in the size and the cost of the apparatus and a method to control the image reading apparatus.

One aspect of the present invention provides an image reading apparatus comprising: a conveying unit that sequentially conveys a plurality of original document sheets in a state where a distance between original document sheets is a predetermined distance; a first image reading unit that reads an image on a first side of an original document sheet that is being conveyed by the conveying unit; a second image reading unit that reads an image on a second side that is a back side of the first side of the original document sheet that is being conveyed by the conveying unit; and a control unit that, in the case of a single-sided reading mode for reading a single side of an original document sheet, causes the conveying unit to convey a plurality of original document sheets at a first speed in a state where a distance between original document sheets is a first distance and causes the first image reading unit to read an image on the first side of the original document sheets and that, in the case of a double-sided reading mode for reading both sides of an original document sheet, causes the conveying unit to convey a plurality of original document sheets at a second speed that is slower than the first speed in a state where a distance between original document sheets is a second distance that is shorter than the first distance between original document sheets and causes the first image reading unit and the second image reading unit to read the first side and the second side, respectively, of the original document sheets.

Another aspect of the present invention provides a method for controlling an image reading apparatus comprising a conveying unit that sequentially conveys a plurality of original document sheets in a state where a distance between original document sheets is a predetermined distance; a first image reading unit that reads an image on a first side of an original document sheet that is being conveyed by the conveying unit; and a second image reading unit that reads an image on a second side that is a back side of the first side of the original document sheet that is being conveyed by the conveying unit, the method comprising: executing control in which a control unit, in the case of a single-sided reading mode for reading a single side of an original document sheet, causes the conveying unit to convey a plurality of original document sheets at a first speed in a state where a distance between original document sheets is a first distance and causes the first image reading unit to read an image on the first side of the original document sheets, and in the case of a double-sided reading mode for reading both sides of an original document sheet, causes the conveying unit to convey a plurality of original document sheets at a second speed that is slower than the first speed in a state where a distance between original document sheets is a second distance that is shorter than the first distance between original document sheets and causes the first image reading unit and the second image reading unit to read the first side and the second side, respectively, of the original document sheets.

Further features of the present invention will be apparent from the following description of exemplary embodiments with reference to the attached drawings.

BRIEF DESCRIPTION OF THE DRAWINGS

FIG. 4 is a timing chart showing image reading timing and transferring timing during single-sided reading according to the present embodiment.

FIG. 5 is a timing chart showing image reading timing and transferring timing during double-sided reading according to the present embodiment.

FIG. 8 is a timing chart showing image reading timing and transferring timing during double-sided reading of the present embodiment and those during double-sided reading of a comparative example.

DESCRIPTION OF THE EMBODIMENTS

Figure 1:
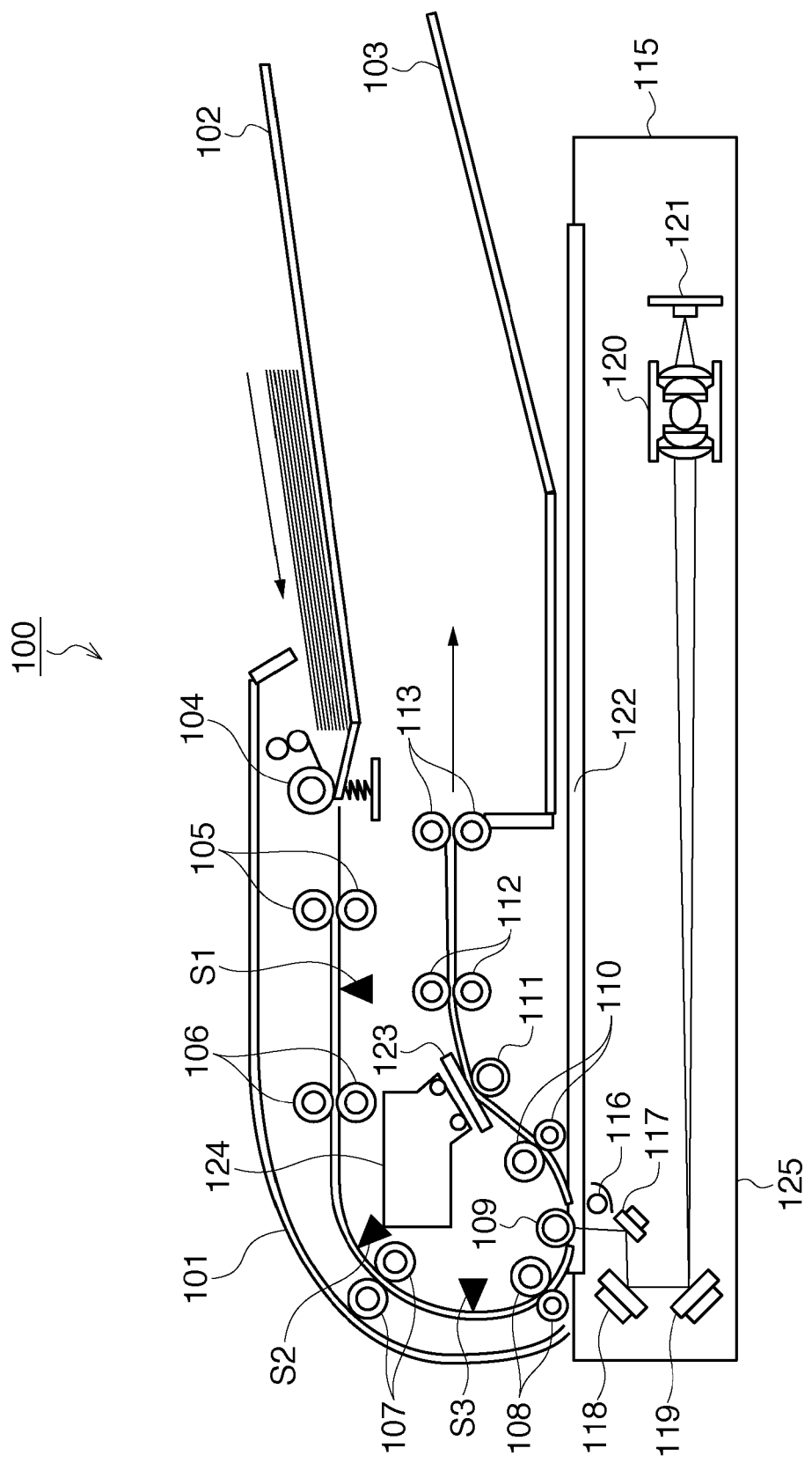
FIG. 1 is a cross-sectional view showing an example of the configuration of an image reading apparatus 100 according to an embodiment of the present invention.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Reading Apparatus

Hereinafter, an embodiment of the present invention will be described with reference to FIGS. 1 to 8. First, referring to FIG. 1, an example of the configuration of an image reading apparatus 100 according to the present embodiment will be described. Although the present embodiment will be described using an image reading apparatus as an example, the present invention is also applicable to an image forming apparatus provided with an image reading unit. The image reading apparatus 100 includes an automatic document feeder 101 and an image reading unit 125.

First, the configuration of the first image reading unit 125 for reading the front side of an original document sheet will be described. The image reading unit 125 includes an image reading sensor unit 121, an imaging lens 120, a light source 116, fold mirrors 117, 118, and 119, an original document platen glass 122, a frame member 115, an image reading unit 124, and a backside reading glass 123.

The image reading sensor unit 121 includes a photoelectric conversion element, such as a CCD or a CMOS, which serves as a light receiving unit. The imaging lens 120 concentrates light from an original document platen onto the image reading sensor unit 121. The light source 116 irradiates an original document sheet on the original document platen with light. The fold mirrors 117, 118, and 119 guide the reflected light from the original document sheet to the photoelectric conversion element. The optical unit frame member (not shown) supports the light source 116 and the fold mirrors 117, 118, and 119. The frame member 115 supports the original document platen glass 122 on which the original document platen is mounted.

The first image reading unit 125 has a fixed-document reading mode and a feeding-document reading mode. In the fixed-document reading mode, an original document sheet is placed on top of the original document platen glass 122, and an image is read while the optical unit frame member is moving along the original document sheet. In the feeding-document reading mode, an original document sheet is conveyed from the automatic document feeder 101, and an image of the original document sheet is read without moving the optical unit frame member. Moreover, the image reading apparatus 100 according to the present embodiment has a single-sided reading mode for reading only an image (a first-side image) on the front side of an original document sheet and a double-sided reading mode for simultaneously reading the image on the front side of an original document sheet and an image (a second-side image, the second side being on the back of the first side) on the back side of the original document sheet. Here, simultaneously reading the front side and the back side means that while the original document sheet is being conveyed from rollers 105 to rollers 113 in FIG. 1, the front side is read by the image reading unit 125 and the back side is read by the image reading unit 124, and is not to be construed as meaning temporal coincidence.

Next, the automatic document feeder 101 will be described. The automatic document feeder 101 includes an original document paper feed tray 102, an original document pickup roller 104, rollers 105 to 113, sensors S1, S2, and S3, and an original document paper discharge tray 103. First, the automatic document feeder 101 feeds paper from the original document paper feed tray 102 while separating the paper sheet by sheet with the original document pickup roller 104. Then, each original document sheet is conveyed by the rollers 105 to 108 and conveyed to the position of the roller 109. At the position of the roller 109, light from the light source 116 that has moved to a position facing the roller 109 is reflected by the original document sheet, the reflected light is then reflected by the fold mirrors 117, 118, and 119, and the resulting reflected light is transmitted to the image reading sensor unit 121 via the imaging lens 120. Thus, an image on the front side of the original document sheet is read. Subsequently, the original document sheet is discharged to the original document paper discharge tray 103 via the rollers 110 to 113.

Next, reading of an image on the back side will be described. An original document sheet that has passed the roller 109, which is located in a position at which the front side is read, then passes through the rollers 110 and reaches roller 111. At the position of the roller 111, the original document sheet is conveyed in between the backside reading glass 123 and the roller 111, and an image on the back side of the original document sheet is read by the second image reading unit 124 that is positioned on the side of the backside reading glass 123 that is opposite from the roller 111. The image reading unit 124 may be an optical unit of a minification optical system that performs photoelectric conversion with a photoelectric conversion element, such as a CCD sensor or a CMOS sensor, that employs a fold mirror and a condensing lens, or a CIS (contact image sensor) that employs a selfoc lens array. Moreover, although not shown in FIG. 1, a light source is contained in the image reading unit 124. Light from the light source of the image reading unit 124 is transmitted through the backside reading glass 123 and irradiated onto the back side of the original document sheet that is conveyed in between the backside reading glass 123 and the roller 111, and the reflected light is read and photoelectrically converted by the photoelectric conversion element of the image reading unit 124.

However, since the image reading unit 124 needs to be provided within a conveyance path of the automatic document feeder 101, it is necessary that an optical system from reading of an original document sheet to the photoelectric conversion element is small. Thus, the second image reading unit 124 is made small and has an accordingly decreased light condensing rate for light from the original document sheet, resulting in a lower sensitivity than that of the first image reading unit 125. Therefore, it is conceivable to use, for example, a xenon lamp in order to increase the quantity of light from the light source of the image reading unit 124. However, there is a problem that a xenon lamp generates a large amount of heat, and it is necessary to incorporate a cooling system, such as a fan, to cope with this heat, which leads to increases in the size and the cost of the apparatus. Moreover, even in the case where a light source that generates little heat like an LED light source is used, it is necessary to increase the number of LEDs in order to increase the light quantity, and in any case, if an equivalent sensitivity to that of the first image reading unit 125 is to be achieved, it will result in increases in the size and the cost of the apparatus. For the forgoing reasons, an allowable value of the scanning speed of the second image reading unit 124 is lower than an allowable value of the scanning speed of the first image reading unit 125.

Scanning Speed

Here, the scanning speed at which an original document sheet is read of the first and the second image reading units 125 and 124 according to the present embodiment will be described. Since the present embodiment is described assuming that reading is performed in the feeding-document reading mode, the scanning speed is synonymous with the conveying speed of an original document sheet when the original document sheet is being read. Specifically, in the feeding-document reading mode, the image reading units 125 and 124 read the original document sheet that is being conveyed at the position of the roller 109 corresponding to the reading position for the front side and the position of the roller 111 corresponding to the reading position for the back side, respectively, in FIG. 1. Accordingly, the scanning speed, at which an original document sheet is read, of each image reading unit depends on the conveying speed of the original document sheet at the above-described reading position. A scanning speed (first scanning speed) V1 of the first image reading unit 125 during the single-sided reading mode is controlled, with respect to a scanning speed (second scanning speed) V2 of the second image reading unit 124 for the back side during the double-sided reading mode, so as to satisfy V1>V2. That is to say, in the present embodiment, the original document conveying speed in the single-sided reading mode is controlled so as to be faster than the original document conveying speed in the double-sided reading mode.

According to the present embodiment, the scanning speed of the first image reading unit 125 during the double-sided reading mode is set to a slower scanning speed than V1, for example, the above-described scanning speed V2. Moreover, an illuminance I1 (lx) of the light source 116 of the first image reading unit 125 and an illuminance I2 (lx) of the light source of the second image reading unit 124 have a relationship I1>I2.

It should be noted that in order to change the scanning speed of the first image reading unit 125 from V1 to V2, it is necessary to reduce the quantity of light incident on the photoelectric conversion element of the first image reading unit 125 to a quantity smaller than that during the single-sided reading mode. Thus, in the present embodiment, in the case where the first image reading unit 125 performs reading at V2, which is slower than the scanning speed V1, at least one of the illuminance of the light source 116 of the first image reading unit 125, an accumulation period of a photosensitive pixel, a pixel reading speed, and a gain of an amplifier circuit within an analog signal processing unit is switched. In this manner, in the first image reading unit 125, the quantity of incident light can be controlled to a quantity suited to the scanning speed V2 so as to prevent an excessive quantity of incident light.

Reading Control Configuration

Figure 2:
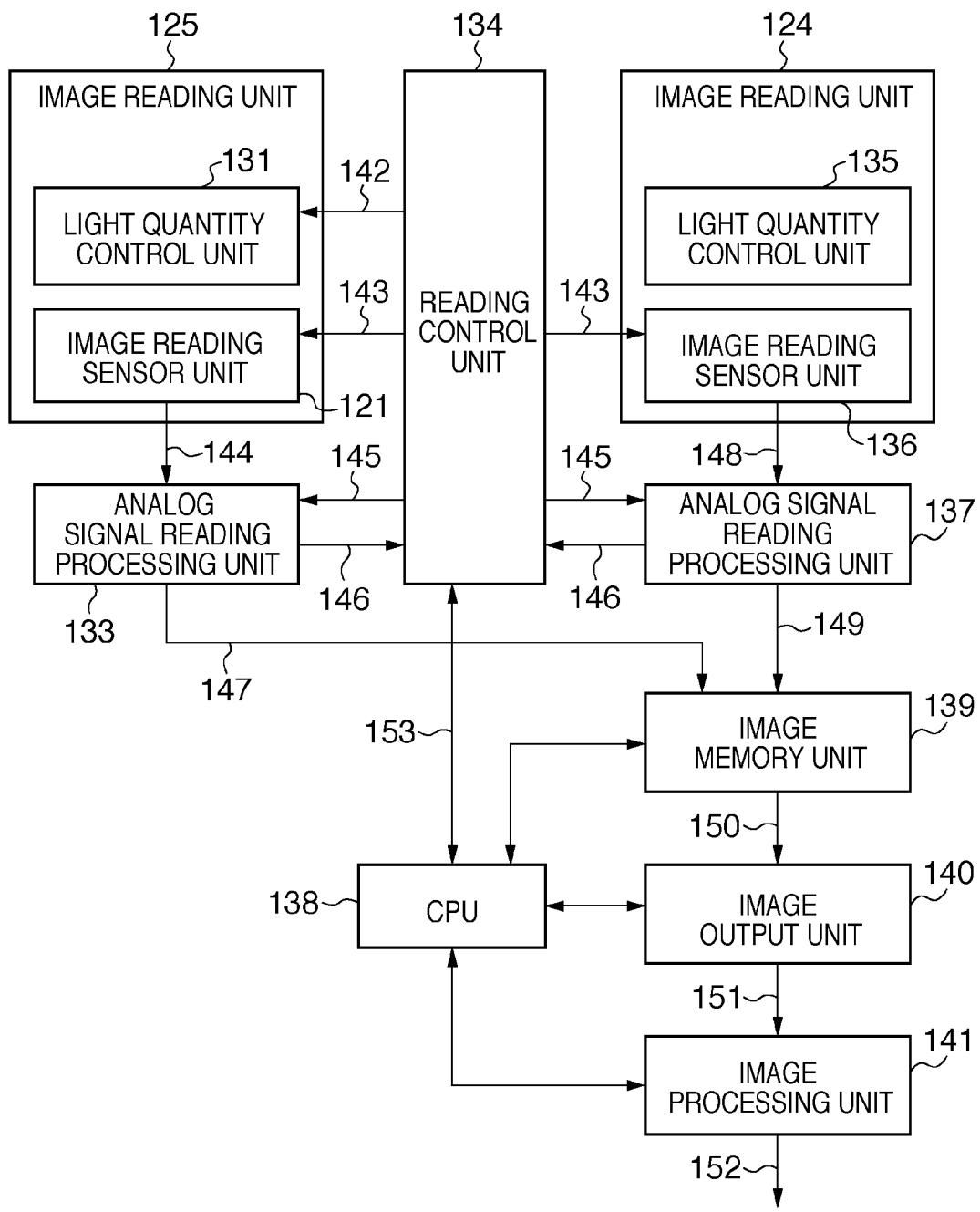
FIG. 2 is a diagram showing an example of a circuit block for reading control according to the present embodiment.

Next, a reading control configuration of the image reading apparatus 100 will be described with reference to FIG. 2. First, a circuit block for the front side will be described. The image reading unit 125 for the front side is constituted by a light quantity control unit 131 that controls the quantity of light from the light source 116 and the image reading sensor unit 121 that includes the photoelectric conversion element. The light quantity control unit 131 controls the quantity of light from the light source 116 in accordance with a light quantity adjustment value 142 for controlling the quantity of light from the light source from a reading control unit 134. The image reading sensor unit 121 turns on the light source 116 at a predetermined timing in accordance with a timing signal 143 generated by a timing generator circuit built in the reading control unit 134. Thus, the image reading unit 125 sequentially converts light information from an original document sheet into analog image signals 144 and outputs the analog signals to an analog signal reading processing unit 133. The analog signal reading processing unit 133 converts the analog image signals 144 output from the image reading sensor unit 121 into digital image signals 147 in accordance with a timing signal 145 that is likewise from the reading control unit 134. Moreover, when performing shading correction, the analog image signals 144 output from the image reading sensor unit 121 are sent to the reading control unit 134 as shading data 146. The shading data 146 sent to the reading control unit 134 is used by a CPU 138 that is connected to the reading control unit 134 via a data bus 153, to determine a shading correction value. The determined shading correction value is set in an image processing unit 141, where shading correction is applied to image data. Moreover, in the present embodiment, the CPU 138 functions as a control unit.

Next, a circuit block for the back side will be described. The image reading unit 124 for the back side is constituted by a light quantity control unit 135 that controls the quantity of light from the light source and an image reading sensor unit 136 that includes the photoelectric conversion element. The image reading sensor unit 136 sequentially converts light information from an original document sheet into analog image signals 148 and outputs the analog signals, in accordance with the timing signal 143 generated by the timing generator circuit built in the reading control unit 134. The light quantity control unit 135, unlike the light quantity control unit 131 for the front side, does not receive a control signal from the reading control unit 134. The reason for this is that since the image reading unit 124 does not change the light quantity depending on the scanning speed, this light quantity control unit serves as a control block for operating the light source at a constant light quantity. An analog signal reading processing unit 137 converts the analog image signals 148 output from the image reading sensor unit 136 into digital image signals 149 in accordance with the timing signal 145 from the reading control unit 134. Moreover, when performing shading correction, the analog image signals 148 output from the image reading sensor unit 136 are sent to the reading control unit 134 as the shading data 146. The shading data 146 sent to the reading control unit 134 is used by the CPU 138 that is connected to the reading control unit 134 via the data bus 153, to determine a shading correction value. The determined shading correction value is set in the image processing unit 141, where shading correction is applied to image data. The image processing unit 141 holds the shading correction value for the front side and the shading correction value for the back side and performs shading correction on the frontside/backside image data.

The digital image signals 147 for the front side and the digital image signals 149 for the back side are sent to an image memory unit (storage unit) 139 and temporarily held in the image memory unit 139. The image memory unit 139 controls writing and readout of the digital image signals sent to the image memory unit 139, according to an instruction from the CPU 138. The image memory unit 139 alternately outputs the temporarily held digital image signals of the frontside image data and of the backside image data to an image output unit 140. On the other hand, during the single-sided reading mode (the case where only the image reading unit 125 is used), only the frontside image data is sequentially read out from the image memory unit 139.

According to the present embodiment, in the case where a plurality of original document sheets are sequentially conveyed, the interval between image data sets of digital image signals 150 differs between when the single-sided reading mode is used and when the double-sided reading mode is used. An instruction regarding these timings is issued to the image memory unit 139 by the CPU 138. Specifically, an interval T1 (ms) between a preceding image and a following image of the digital image signals 150 during the single-sided reading mode, and an interval T2 (ms) between a preceding image and a following image of the digital image signals 150 during the double-sided reading mode are controlled so as to satisfy T1>T2.

Reading Timing and Transfer Timing

Next, the timing at which an image is read and the timing at which image data is transferred of the present embodiment will be described with reference to FIGS. 4, 5, and 8. FIG. 4 shows the relationship between the image reading timing and image data transfer in the case of the single-sided reading mode. Also, FIG. 5 shows the relationship between the image reading timing and image data transfer in the case of the double-sided reading mode. FIG. 8 shows a comparison of the image reading timing and the transfer timing of a comparative example with those of the present embodiment.

First, in the single-sided reading mode in FIG. 4, only the first image reading unit 125 is used because only one side (the front side) is to be read. Reference numeral 401 shown in FIG. 4 indicates image reading timings. Reference numeral 402 indicates timings at which image data that has been read is transferred. The scanning speed at which an image is read, that is, the original document conveying speed in the single-sided reading mode is V1 (mm/ms), and the time between sheets of paper from when the trailing edge of a preceding original document sheet passes the image reading position of the roller 109 to when the leading edge of a following original document sheet passes that position is α (ms). That is to say, a distance between original document sheets (a first distance between original document sheets) X1 (mm), which is the distance between the trailing edge of the preceding original document sheet and the leading edge of the following original document sheet at the image reading position of the roller 109, is X1 (mm)=V1×α. Image data that has been read is temporarily held in the image memory unit 139, and afterward, sequentially output to the image output unit 140. Therefore, the timing at which image data is output to the image output unit 140 lags behind the image reading timing by Tα (ms), and a data interval (a first time interval) in the image output unit 140 is T1 (ms). The reason why the data interval is T1 in FIG. 4 is that when data is transferred from the image output unit 140 to the image processing unit 141, a processing time in an image processing block is required. Therefore, the data interval T1 contains the time between sheets of paper α at the reading position plus a delay time in the image processing block. Here, "between sheets of paper" refers to an interval between the trailing edge of a preceding original document sheet and the leading edge of the following next original document sheet at the reading positions of the first and the second image reading units 125 and 124. Therefore, the time between sheets of paper represents this interval in terms of time. Moreover, the distance between sheets of paper represents this interval in terms of distance. Furthermore, the reading position in the case of the first image reading unit 125 indicates the position at which the roller 109 and the original document platen glass 122 are in contact with each other. On the other hand, in the case of the second image reading unit 124, the reading position indicates the position at which the roller 111 and the backside reading glass 123 are in contact with each other.

Next, timings during double-sided reading will be described with reference to FIG. 5. Reference numeral 501 indicates timings at which an image of the front side is read. Reference numeral 502 indicates timings at which an image of the back side is read. Reference numeral 503 indicates timings at which image data that has been read is transferred. In the case of double-sided reading, the scanning speed of the first image reading unit 125 is adjusted to conform to that of the second image reading unit 124, and thus the scanning speed for the front side and the back side is V2 (mm/ms). That is, during double-sided reading, the scanning speed is slower than the scanning speed V1 during single-sided reading. Thus, the scanning speed of the first and the second image reading units 125 and 124 is V2, and the automatic document feeder 101 conveys an original document sheet in accordance with the speed V2. Moreover, in the present embodiment, a distance between sheets of paper X2 (a second distance between original document sheets) at the image reading positions of the rollers 109 and 111 during double-sided reading is set so as to be shorter than the interval X1 during single-sided reading. With respect to original document conveyance control, the interval between sheets or paper is controlled so that a time between sheets of paper β (ms) satisfies X1>X2, that is, a relation β<(V1×α)/V2 holds. In FIG. 5, a data interval (a second time interval) T2 is a processing time taken in the image processing block when data is transferred from the image output unit 140 to the image processing unit 141, and T2 (ms) does not contain a delay time of the time between sheets of paper β at the reading positions. The reason for this is that in the case where images of both sides are simultaneously read, the time between sheets of paper β occurring at the reading position is absorbed in the image memory unit 139 and thus is no longer contained in the image transfer delay time in the image output unit 140.

Next, differences in timings during double-sided reading between the present embodiment and the comparative example will be described with reference to FIG. 8. A timing chart 800 is the same as the timing chart in FIG. 5 according to the present embodiment, and so the description thereof is omitted. A timing chart 810 is a timing chart during double-sided reading serving as the comparative example. Reference numeral 801 indicates timings at which an image of the front side is read. Reference numeral 802 indicates timings at which an image of the back side is read. Reference numeral 803 indicates timings at which image data that has been read is transferred.

The timing chart 810 of the comparative example shows timings in the case where the scanning speed is changed from V1 to V2 and the distance between original document sheets is not changed when the reading mode is changed from the single-sided reading mode to the double-sided reading mode. On the other hand, the timing chart 800 according to the present embodiment shows, as described using FIG. 5, timings in the case where the scanning speed is changed from V1 to V2 when the mode is changed from the single-sided reading mode to the double-sided reading mode and control is performed in such a manner that the distance between original document sheets in the double-sided reading mode is shorter than that in the single-sided reading mode. Therefore, as shown in FIG. 8, while the time between sheets of paper during the double-sided reading mode of the present embodiment is β (ms), a time between sheets of paper γ (ms) of the comparative example satisfies γ>β. Thus, as shown by the image data transfer timings 803, a data interval T3 (ms) between the back side of a first sheet and the front side of a second sheet is T3>T2. In other words, in the comparative example, an amount of time equal to T3−T2 (ms) has uselessly elapsed when compared to the present embodiment. In this manner, in the image reading apparatus according to the present embodiment, as shown by the timing chart 800, in the case where reading is performed at an original document scanning speed suited to the double-sided reading mode, the distance between original document sheets is set shorter than that in the single-sided reading mode (within a range in which image data transfer processing can be performed). Thus, the present image reading apparatus is capable of improving the original document reading productivity.

Conveyance Control Configuration

Figure 6:
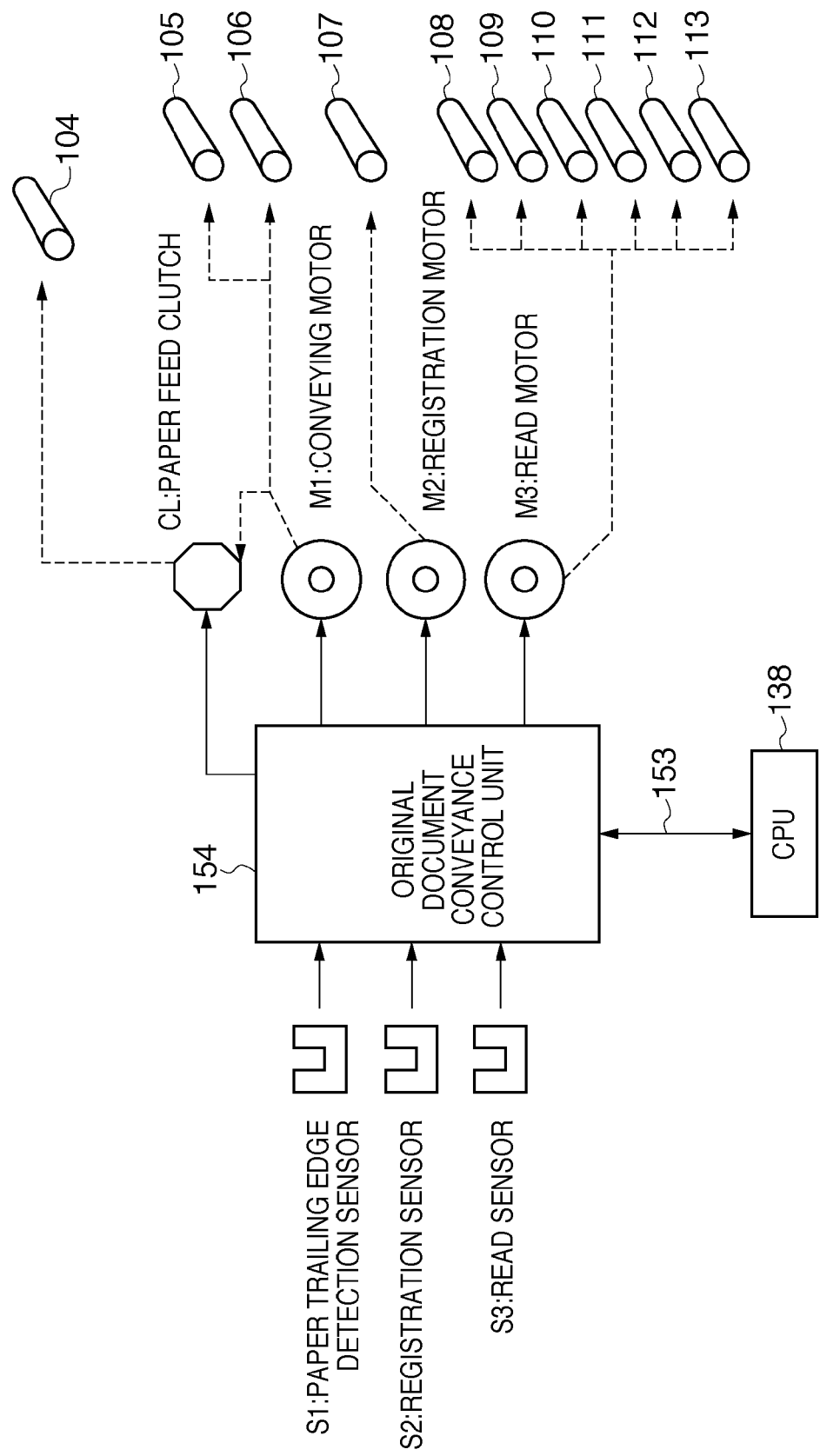
FIG. 6 is a diagram showing a control configuration of an automatic document feeder 101 according to the present embodiment.

Next, a control configuration of the automatic document feeder 101 will be described with reference to FIG. 6. The CPU 138 is connected to an original document conveyance control unit 154 by the data bus 153. The original document conveyance control unit 154 controls a conveying motor M1, a registration motor M2, and a read motor M3 for conveying an original document sheet. Moreover, the original document conveyance control unit 154 receives signals from a paper trailing edge detection sensor S1, a registration sensor S2, and a read sensor S3 for generating a timing at which an original document sheet is conveyed, and informs the CPU 138 of the state of the sensors. A paper feed clutch CL is provided to transmit the drive of the conveying motor M1 to the original document pickup roller 104 when an original document sheet is to be fed from the original document paper feed tray 102, and the drive control of this clutch is performed by the original document conveyance control unit 154. The conveying motor M1 drives the rollers 105 and 106. The registration motor M2 drives the roller 107. The read motor M3 drives the rollers 108, 109, 110, 111, 112, and 113.

Conveyance Timing

Figure 7:
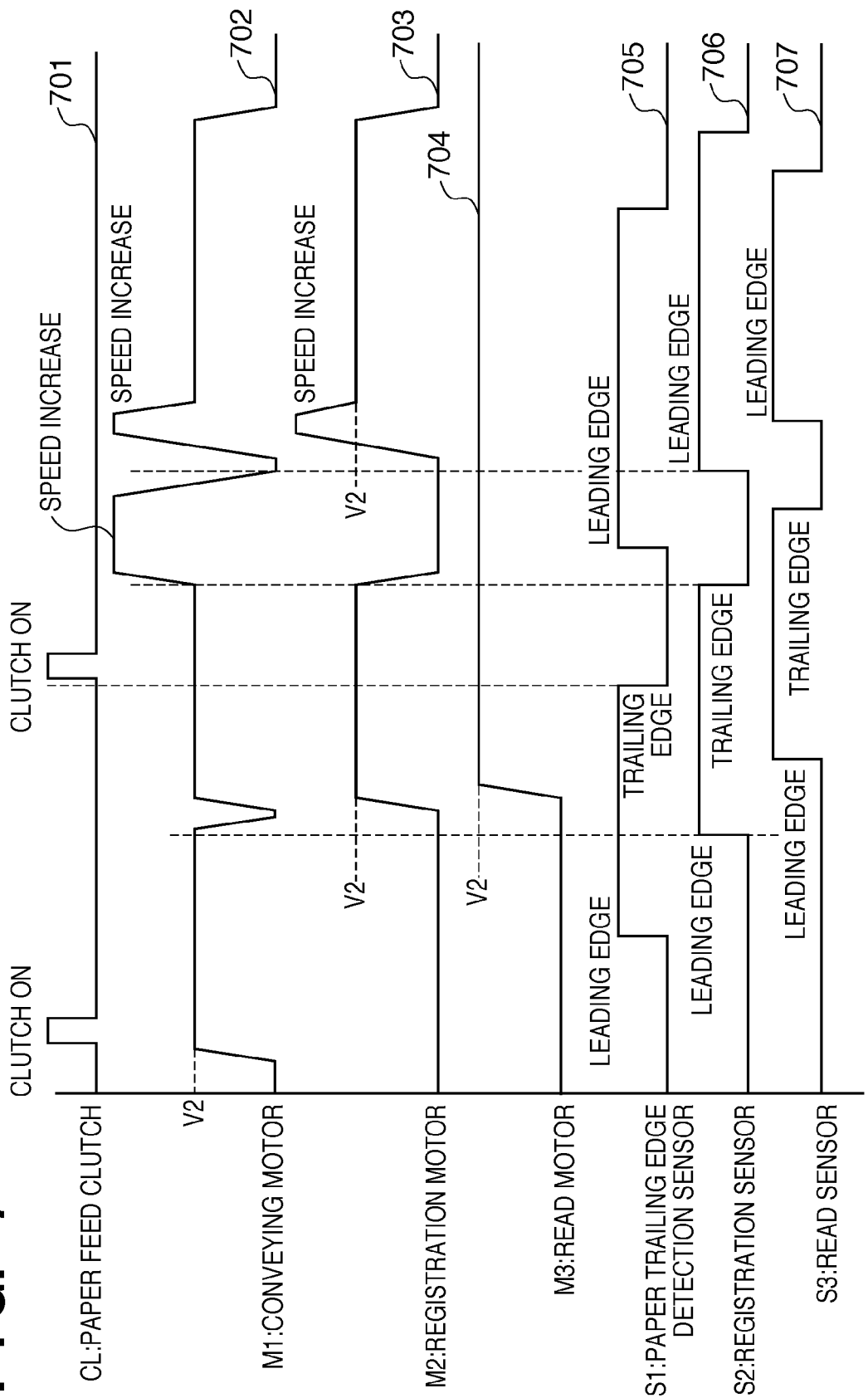
FIG. 7 is a timing chart showing control timing of the automatic document feeder 101 during double-sided reading according to the present embodiment.

Next, original document conveyance control timings will be described with reference to FIG. 7. Reference numeral 701 shown in FIG. 7 indicates timings at which the paper feed clutch CL is driven. Reference numeral 702 indicates timings at which the conveying motor M1 is driven. Reference numeral 703 indicates timings at which the registration motor M2 is driven. Reference numeral 704 indicates a timing at which the read motor M3 is driven. Reference numeral 705 indicates a detection timing of the paper trailing edge detection sensor S1. Reference numeral 706 indicates detection timings of the registration sensor S2. Reference numeral 707 indicates detection timings of the read sensor S3.

First, when the double-sided reading mode is notified to the CPU 138, the original document conveyance control unit 154 sets the original document conveying speed of the conveying motor M1 to a speed that matches the scanning speed V2. Moreover, the original document conveyance control unit 154 drives the conveying motor M1 and operates the paper feed clutch CL to feed a first original document sheet. Afterward, the original document conveyance control unit 154 drives the conveying motor M1 until the paper leading edge reaches the registration sensor S2, and stops the conveying motor M1 after the registration sensor S2 has detected the paper leading edge. During a period between the start of feeding of the original document sheet and the detection of the paper leading edge by the registration sensor S2, the registration motor M2 and the read motor M3 still remain at rest.

Next, the original document conveyance control unit 154 drives the conveying motor M1, the registration motor M2, and the read motor M3 simultaneously at a speed that matches the scanning speed V2. When the leading edge of the first original document sheet reaches the read sensor S3, reading of an image of the front side is started after the elapse of a predetermined delay time during double-sided reading from that point of time. Furthermore, when a predetermined delay time during double-sided reading has elapsed from the timing of the start of reading of the image of the front side, reading of an image of the back side is started.

After that, when the trailing edge of the first original document sheet has passed the paper trailing edge detection sensor S1, the original document conveyance control unit 154 drives the paper feed clutch CL and starts feeding of a second original document sheet. When the trailing edge of the first original document sheet has passed the registration sensor S2, the original document conveyance control unit 154 stops the drive of the registration motor M2 and also accelerates the original document conveying speed of the conveying motor M1. After that, the original document conveyance control unit 154 decelerates the original document conveying speed just before the rollers 107 serving as registration rollers and stops the drive of the conveying motor M1 at the timing when the leading edge of the second original document sheet has reached the registration sensor S2. At this timing, the paper trailing edge of the preceding first sheet has not yet reached the read sensor S3.

When the trailing edge of the first original document sheet has reached the read sensor S3, the original document conveyance control unit 154 starts driving the registration motor M2 and the conveying motor M1 at the same time. Furthermore, the original document conveyance control unit 154 causes the original document sheet to be conveyed at a speed faster than the speed that matches the scanning speed V2 so that the distance between sheets of paper between the trailing edge of the preceding first original document sheet and the leading edge of the second original document sheet becomes X2 before the second original document sheet reaches the rollers 108. Thus, the distance between original document sheets becomes X2 before the leading edge of the second original document sheet reaches the rollers 108. When the distance between sheets of paper has become X2, the original document conveyance control unit 154 decelerates the conveying motor M1 and the registration motor M2 to the speed that matches the image scanning speed V2 and thereafter uses the read motor M3 to convey the original document sheet. In this manner, adjustment of the distance between sheets of paper X2 is performed in the present embodiment.

Control Procedure

Figure 3A:
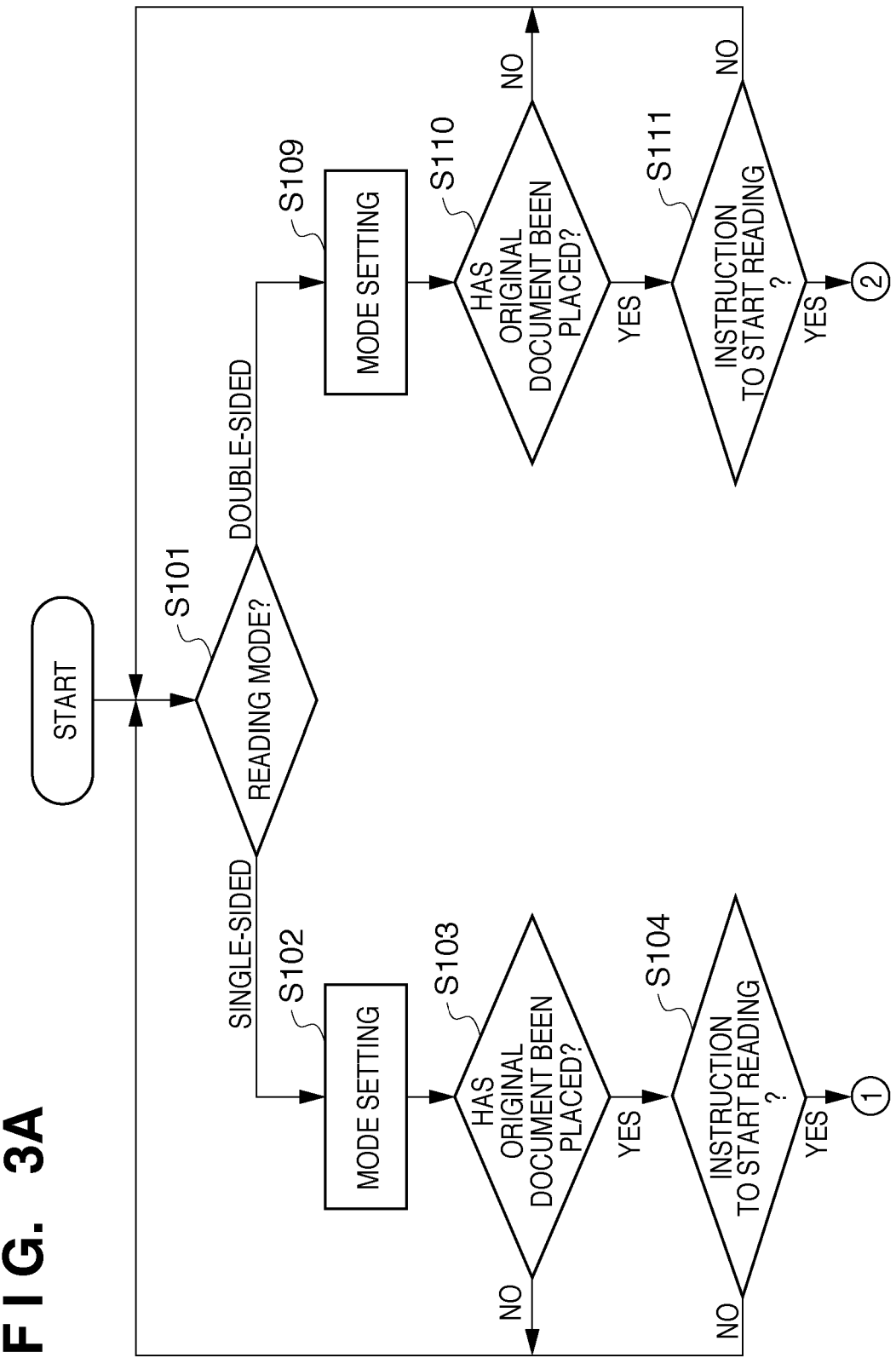
FIGS. 3A and 3B are flowcharts showing a control procedure of the image reading apparatus 100 according to the present embodiment.
Figure 3B:
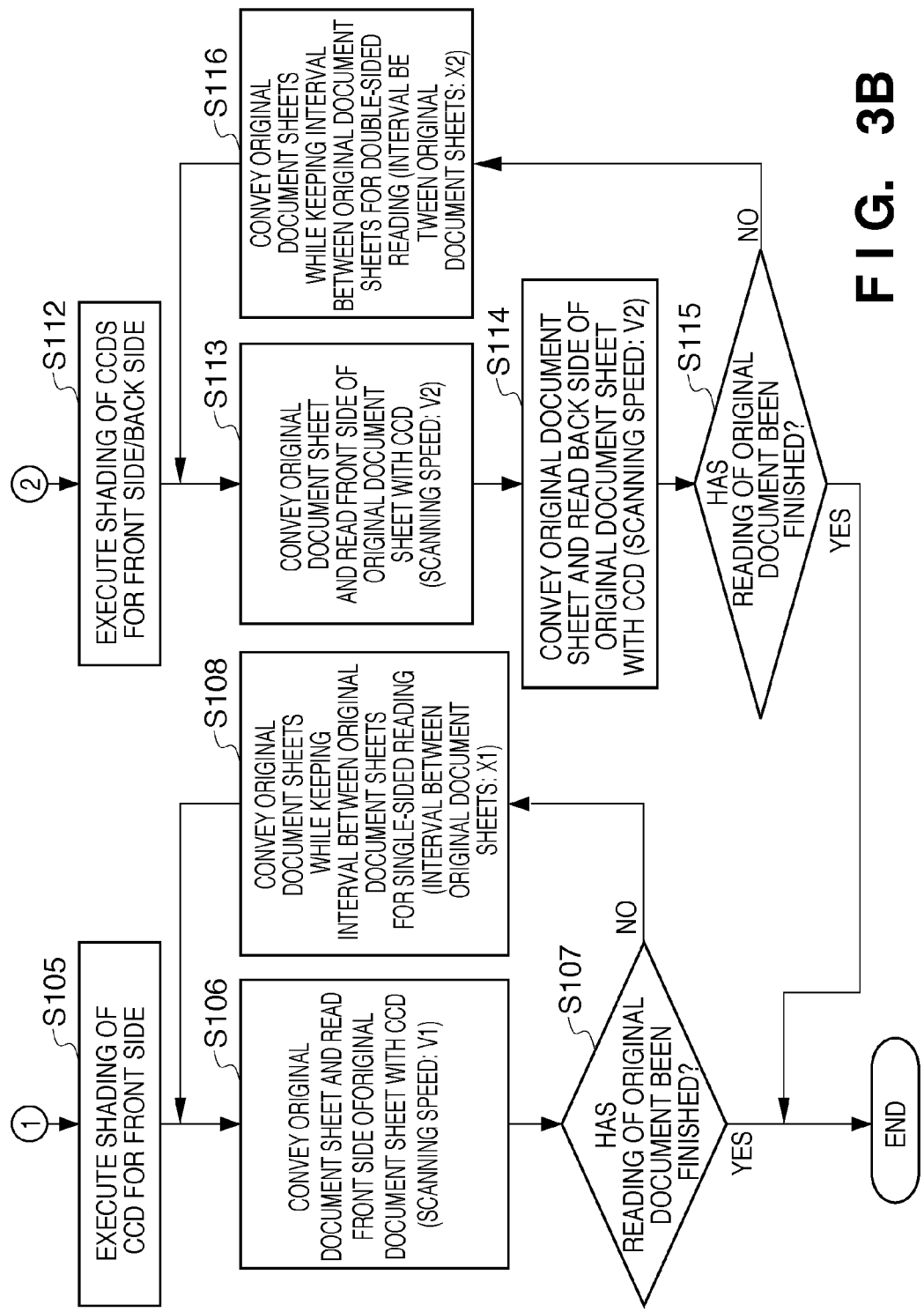

Next, a control procedure of image reading control of the present embodiment will be described with reference to FIGS. 3A and 3B. The process described below is executed by the CPU 138 in accordance with a prestored program. First, in step S101, the CPU 138 determines whether the original document sheet reading mode that has been set is the single-sided reading mode or the double-sided reading mode. Here, if the reading mode is the single-sided reading mode, the process proceeds to step S102, and the CPU 138 performs setting for single-sided reading. Specifically, the CPU 138 sets the scanning speed of a CCD sensor (or a CMOS sensor) of the image reading unit 125 to V1 (mm/ms). Furthermore, the CPU 138 sets each of the accumulation period of a photosensitive pixel of the CCD sensor, the quantity of light from the light source, the pixel reading speed, and the gain of the amplifier circuit of the analog signal reading processing unit 133 to a predetermined value.

Here, the accumulation period of the CCD sensor indicates the time for which the quantity of light received by a photodiode of the CCD sensor is accumulated as an electric charge. Moreover, the accumulation period is set within a main-scanning reading time for a single line of an image. Therefore, the shorter the main-scanning reading time for a single line, the shorter the accumulation period needs to be set. Conversely, in the case where the main-scanning reading time for a single line is lengthened, the sensitivity increases, and therefore the accumulation period can be lengthened. Moreover, even without changing the accumulation period, it is also possible to decrease the sensitivity by reducing the quantity of light from the light source, and it is also possible to change the sensitivity by changing the gain of an analog value that has been output with an increased sensitivity of the CCD sensor. That is to say, when changing the scanning speed, the sensitivity of the image reading unit 125 can be adjusted to conform to the scanning speed by changing at least one setting out of the accumulation period of a photosensitive pixel of the CCD sensor, the quantity of light from the light source, the pixel reading speed, and the gain of the amplifier circuit in the analog signal reading processing unit 133.

If the single-sided reading mode is set in step S102, in step S103, the CPU 138 determines whether or not an original document has been placed, and if the original document has been placed, the process proceeds to step S104. On the other hand, if the original document has not been placed, the process returns to step S101. In step S104, the CPU 138 determines whether or not an instruction to start reading has been provided, and if the instruction has been provided, the process proceeds to step S105. On the other hand, if the instruction to start reading has not been provided, the process returns to step S101. In step S105, the CPU 138 causes the CCD sensor of the image reading unit 125 for the front side to perform a shading operation.

Subsequently, in step S106, the CPU 138 causes the automatic document feeder 101 to convey the original document sheet by sheet and causes the CCD sensor to read image information of the front side of each original document sheet. The scanning speed here is V1. Furthermore, in step S107, the CPU 138 determines whether or not the original document sheet that is currently being read is the last original document sheet to be read. Here, if the currently read original document sheet is the last original document sheet, the process of this flowchart is finished when the current reading processing is completed, returning to an ordinary standby mode. On the other hand, if an original document sheet to be read still remains, the process proceeds to step S108. In step S108, the CPU 138 adjusts the conveying speed of a second original document sheet so that the interval between sheets of paper between the trailing edge of the preceding first original document sheet and the leading edge of the second original document sheet becomes X1 (the interval between sheets of paper during single-sided reading) at the reading position (the position of the roller 109), and returns the process to step S106.

In this manner, in the single-sided reading mode, the scanning speed of the CCD sensor (or the CMOS sensor) is set to the scanning speed V1 (mm/ms), which is faster than a preset scanning speed of the CCD sensor (or the CMOS sensor) of the second image reading unit 124. Thus, reading of an original document sheet can be performed at the scanning speed V1 that is faster than the scanning speed V2 in the double-sided reading mode.

On the other hand, if it is determined in step S101 that the reading mode is the double-sided reading mode, the process proceeds to step S109, and the CPU 138 performs setting for double-sided reading. Specifically, the CPU 138 sets the scanning speed of the CCD sensor of the first image reading unit 125 to the scanning speed V2 (mm/ms) of the CCD sensor of the second image reading unit. Furthermore, the CPU 138 sets each of the accumulation period of a photosensitive pixel of the CCD sensor, the quantity of light from the light source, the pixel reading speed, and the gain of the amplifier circuit in the analog signal reading processing unit 133 to a predetermined value.

When the double-sided reading mode has been set in step S109, in step S110, the CPU 138 determines whether or not an original document has been placed, and if the original document has been placed, the process proceeds to step S111. On the other hand, if the original document has not been placed, the process returns to step S101. In step S111, the CPU 138 determines whether or not an instruction to start reading has been provided, and if the instruction has been provided, the process proceeds to step S112. On the other hand, if the instruction to start reading has not been provided, the process returns to step S101. In step S112, the CPU 138 causes the CCD sensor of the image reading unit 125 for the front side and the CCD sensor of the image reading unit 124 for the back side to execute the shading operation.

Subsequently, in step S113, the CPU 138 causes the automatic document feeder 101 to convey the original document sheet by sheet and causes the CCD sensor of the image reading unit 125 to read image information of the front side of each original document sheet. The scanning speed here is V2. Furthermore, in step S114, when an original document sheet has been conveyed to the roller 111 and has reached the reading position of the second image reading unit 124, the CPU 138 causes the image reading unit 124 to read an image of the back side of the original document sheet. Furthermore, in step S115, the CPU 138 determines whether or not the original document sheet that is currently being read is the last original document sheet to be read. Here, if the currently read original document sheet is the last original document sheet, the process of this flowchart is finished when the current reading processing is completed, returning to the ordinary standby mode. On the other hand, if an original document sheet to be read still remains, the process proceeds to step S116. In step S116, the CPU 138 adjusts the conveying speed of a second original document sheet so that the interval between sheets of paper between the trailing edge of the preceding first original document sheet and the leading edge of the second original document sheet becomes X2 (the interval between sheets of paper during double-sided reading) at the reading position (the position of the roller 109), and returns the process to step S113.

In this manner, in the double-sided reading mode, since the original document conveying speed is constant from the roller 109 to the roller 111, the scanning speed of the CCD sensor of the first image reading unit 125 is adjusted to conform to the scanning speed V2 (mm/ms) of the CCD sensor of the second image reading unit 124. However, in the case where the scanning speed of the CCD sensor of the first image reading unit 125 is reduced from the scanning speed V1 (mm/ms) of the CCD sensor alone to V2, the apparent sensitivity per pixel increases when compared to that at V1. Therefore, the reading control unit 134, in step S109, adjusts the accumulation period of the photosensitive pixel of the CCD sensor to a shorter period by an amount corresponding to the reduction in the scanning speed of a CCD driver of the image reading sensor unit 121 so that an equivalent image to that at V1 can be obtained. Alternatively, the reading control unit 134 performs setting in step S109 so as to adjust the quantity of light from the light source by an amount corresponding to the reduction in the scanning speed, reduce the pixel reading speed by an amount corresponding to the reduction in the scanning speed, or reduce the gain of the amplifier circuit in the analog signal reading processing unit 133.

As described above, the image reading apparatus 100 according to the present embodiment controls the scanning speed of the first image reading unit 125 to a first scanning speed and controls the distance between original document sheets to a first distance between original document sheets in the case of the single-sided reading mode. On the other hand, in the case of the double-sided reading mode, the image reading apparatus 100 controls the scanning speed of the first image reading unit 125 and the second image reading unit 124 to a second scanning speed that is slower than the first scanning speed and controls the distance between original document sheets to a second distance between original document sheets that is shorter than the first distance between original document sheets. Furthermore, the image reading apparatus 100 temporarily stores image data that has been read from an original document sheet by the image reading units 125 and 124 in an image memory or the like, and outputs the image data of the front side stored in the image memory at a first time interval in the case of the single-sided reading mode. On the other hand, in the case of the double-sided reading mode, the image reading apparatus 100 alternately outputs the image data of the front side and the image data of the back side stored in the image memory at a second time interval that is longer than the first time interval. In this manner, the image reading apparatus according to the present embodiment is provided with the image reading unit 124 that has a relatively slow scanning speed and that reads the back side of an original document sheet in addition to the ordinary image reading unit 125, and it is thus possible to suppress increases in the size and the cost of the apparatus and read both sides of the original document sheet simultaneously. Furthermore, the present image reading apparatus shortens the interval between sheets of paper in the double-sided reading mode as compared to the interval between sheets of paper in the single-sided reading mode, and it is thus possible to improve the reading productivity.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-022521 filed on Feb. 3, 2010, which is hereby incorporated by reference herein in its entirety.

What is claimed is:

1. An image reading apparatus comprising:
   a conveying unit that sequentially conveys a plurality of original document sheets in a state where a distance between original document sheets is a predetermined distance;
   a first image reading unit that reads an image on a first side of an original document sheet that is being conveyed by the conveying unit;
   a second image reading unit that reads an image on a second side that is a back side of the first side of the original document sheet that is being conveyed by the conveying unit; and
   a control unit that, in the case of a single-sided reading mode for reading a single side of an original document sheet, causes the conveying unit to convey a plurality of original document sheets at a first speed in a state where a distance between original document sheets is a first distance and causes the first image reading unit to read an image on the first side of the original document sheets and that, in the case of a double-sided reading mode for reading both sides of an original document sheet, causes the conveying unit to convey a plurality of original document sheets at a second speed that is slower than the first speed in a state where a distance between original document sheets is a second distance that is shorter than the first distance between original document sheets and causes the first image reading unit and the second image reading unit to read the first side and the second side, respectively, of the original document sheets.

2. The image reading apparatus according to claim 1, further comprising:
   a storage unit that temporarily stores image data read from an original document sheet by the first image reading unit and the second image reading unit; and
   an image output unit that, in the case of the single-sided reading mode, outputs image data read from the first side and stored in the storage unit at a first time interval and that, in the case of the double-sided reading mode, alternately outputs image data read from the first side and stored in the storage unit and image data read from the second side and stored in the storage unit at a second time interval that is shorter than the first time interval.

3. The image reading apparatus according to claim 1, wherein the first image reading unit comprises:
   an irradiation unit that irradiates an original document sheet with light;

a light receiving unit that receives reflected light reflected from the original document sheet and outputs an analog image signal indicating the quantity of received light; and a conversion unit that converts the analog image signal output from the light receiving unit into a digital image signal and outputs the digital image signal as image data read from the original document sheet, and the control unit changes, in the double-sided reading mode and in the single-sided reading mode, at least one of an illuminance of the irradiation unit, an accumulation period of a photosensitive pixel of the light receiving unit, and a gain of an amplifier circuit provided in the conversion unit.

4. The image reading apparatus according to claim 3, wherein the illuminance of the irradiation unit during the double-sided reading mode is smaller than the illuminance during the single-sided reading mode.

5. The image reading apparatus according to claim 1,
wherein the control unit controls the second distance between original document sheets so that a relation $\beta<(V1\times\alpha)/V2$ holds, where the first speed is V1 (mm/ms), the second speed is V2 (mm/ms), the time from passage of a trailing edge of a preceding original document sheet to passage of a leading edge of a following original document sheet in the single-sided reading mode is $\alpha$ (ms), and the time from passage of the trailing edge of a preceding original document sheet to passage of the leading edge of a following original document sheet in the double-sided reading mode is $\beta$ (ms).

6. A method for controlling an image reading apparatus comprising a conveying unit that sequentially conveys a plurality of original document sheets in a state where a distance between original document sheets is a predetermined distance; a first image reading unit that reads an image on a first side of an original document sheet that is being conveyed by the conveying unit; and a second image reading unit that reads an image on a second side that is a back side of the first side of the original document sheet that is being conveyed by the conveying unit, the method comprising:

executing control in which a control unit, in the case of a single-sided reading mode for reading a single side of an original document sheet, causes the conveying unit to convey a plurality of original document sheets at a first speed in a state where a distance between original document sheets is a first distance and causes the first image reading unit to read an image on the first side of the original document sheets, and in the case of a double-sided reading mode for reading both sides of an original document sheet, causes the conveying unit to convey a plurality of original document sheets at a second speed that is slower than the first speed in a state where a distance between original document sheets is a second distance that is shorter than the first distance between original document sheets and causes the first image reading unit and the second image reading unit to read the first side and the second side, respectively, of the original document sheets.

* * * * *